Figure 1:
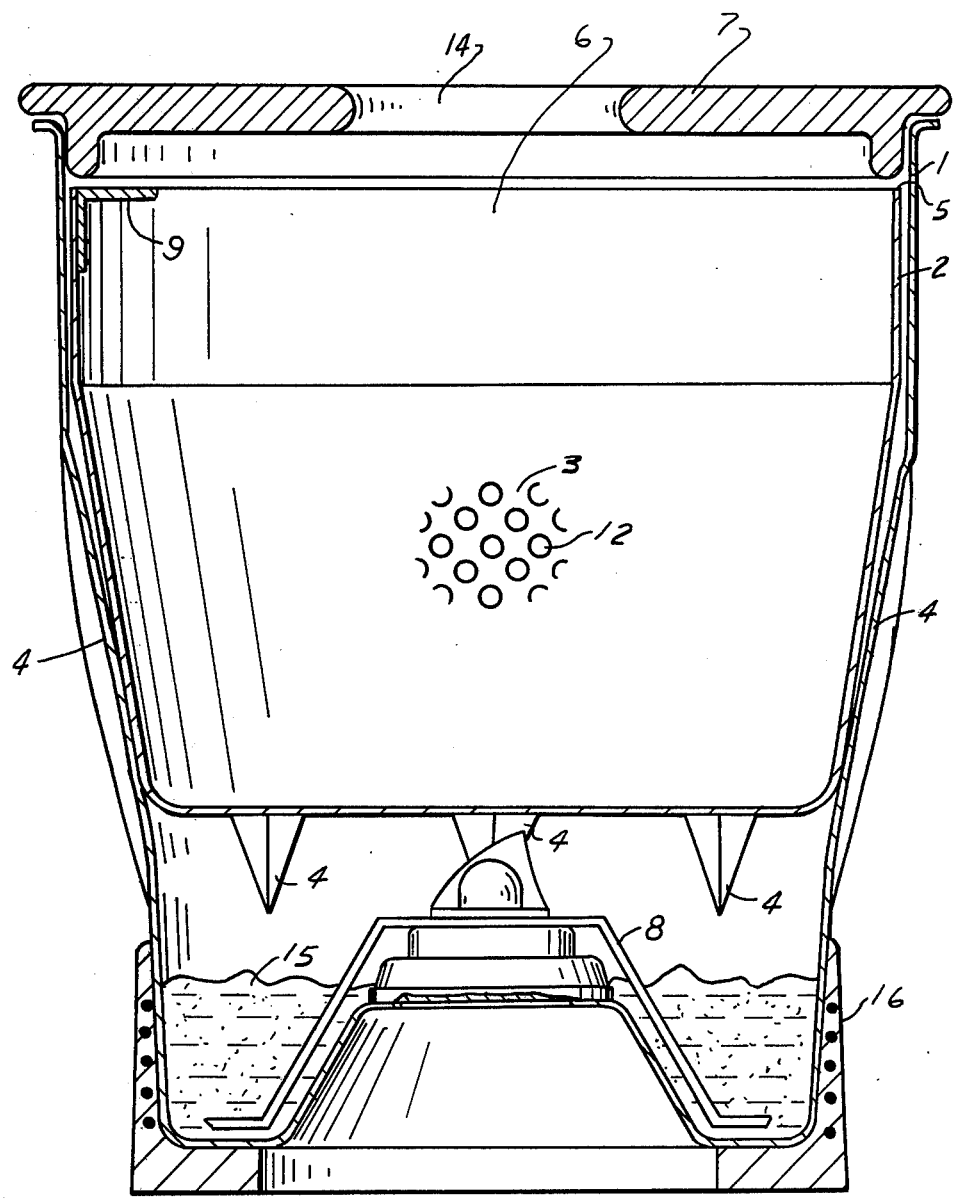

United States Patent [19]

Uibel

[11] 4,137,834
[45] Feb. 6, 1979

[54] COOKING AND MIXING DEVICE FOR HOUSEHOLD PURPOSES

[75] Inventor: Paul-Ulrich Uibel, Ennepetal, Fed. Rep. of Germany

[73] Assignee: Vorwerk & Co. Interholding GmbH, Wuppertal, Fed. Rep. of Germany

[21] Appl. No.: 728,416

[22] Filed: Sep. 30, 1976

[30] Foreign Application Priority Data

Oct. 2, 1975 [DE] Fed. Rep. of Germany ....... 7531236

[51] Int. Cl.² ............................................. A47J 27/00
[52] U.S. Cl. ..................................................... 99/348
[58] Field of Search ................. 99/348, 412, 413, 414, 99/415, 410; 259/107, 108

[56] References Cited

U.S. PATENT DOCUMENTS

| 1,715,721 | 6/1929 | Simon | 99/412 |
| 2,550,758 | 5/1951 | Bemis | 99/414 |
| 3,220,450 | 11/1965 | Aronson | 99/348 |
| 3,508,485 | 4/1970 | Munsey | 99/412 |

FOREIGN PATENT DOCUMENTS 435245 2/1912 France ....................................... 99/413

Primary Examiner—Robert W. Jenkins
Attorney, Agent, or Firm—Michael J. Striker

[57] ABSTRACT

A device for heating and mixing foods, such as a cooking mixer, includes a bowl in which a mixing blade is mounted for orbiting to commingle the food which constitutes the contents of the bowl in operation. A heater is also provided, which heats the contents of the bowl, and the orbiting blade improves the penetration of the heat energy throughout the contents by stirring the same. The device futher includes a separate subdividing accessory in the form of a cup-shaped insert which is permeable to the liquid component of the contents but impermeable to coarse solid components thereof so that when it is desired to comminute such coarse components by the action of the mixing blade, the device is operated without the insert, while the optionally inserted cup-shaped insert is said to contain such coarse solid particles and to prevent them from reaching and being comminuted by the orbiting mixing blade. The insert is supported on inwardly oriented ribs of the bowl, and a lid of the bowl contacts the insert and maintains the same in abutment with the ribs. A handgrip separate from the insert is used for introducing the latter into, and withdrawing the same from, the bowl.

14 Claims, 3 Drawing Figures

COOKING AND MIXING DEVICE FOR HOUSEHOLD PURPOSES

The invention relates to a cooking and mixing device for household purposes, consisting of a conically shaped metallic bowl which is equipped with a closing lid as well as with beating blades in the bowl bottom and with internally oriented creased fins at the periphery, and of a housing, which accommodates a motor with a coupling arrangement for driving the beating blades and a heating arrangement for heating the metallic bowl.

In cooking mixers of this type the contents of the metallic bowl can be heated with a simultaneous rotation of the beating blades. For this reason, such cooking mixers are only suitable for the preparation of soups or mash-like fluids in which the ingredients are simultaneously comminuted.

As a result of this, the rotation of the beating blades during the heating stage has disadvantageous effects, when foodstuffs are to be only heated, but not comminuted.

Accordingly, it is an object of the invention to render possible the heating of foodstuffs which are not to be comminuted, in the above discussed cooking mixers. According to the invention, this object is achieved by accommodating in the metallic bowl a metallic insert which is open at one end, which is shaped similarly to the metallic bowl and comes into abutment at its peripheral surface with the inwardly oriented creased fins and rests at the endface of its open end against the closing lid.

In order for the beating blades to be nevertheless able to freely rotate, it is important that the metallic insert end upwardly of the beating blades.

In order for the metallic insert to be capable of being better introduced into the metallic bowl and again lifted, it is proposed that the metallic insert be provided with an inwardly extending lug at the open end. In addition, it is provided that the sheet lug has an opening in which a separate handgrip is engageable.

The entire jacket of the metallic insert may be provided with circular openings or with slots.

As a result of this, it is achieved by the invention in an advantageous manner, that foodstuffs such as for instance potatoes or farinaceous substances, can be cooked in a cooking mixer with constant circulation of the cooking fluid, without being smashed by the beating blades. Furthermore, use is made in an advantageous manner of the fact that constantly moved fluids cook in a shorter time than stationary fluids. In the following, one embodiment of the invention is shown and described.

Figure 2:
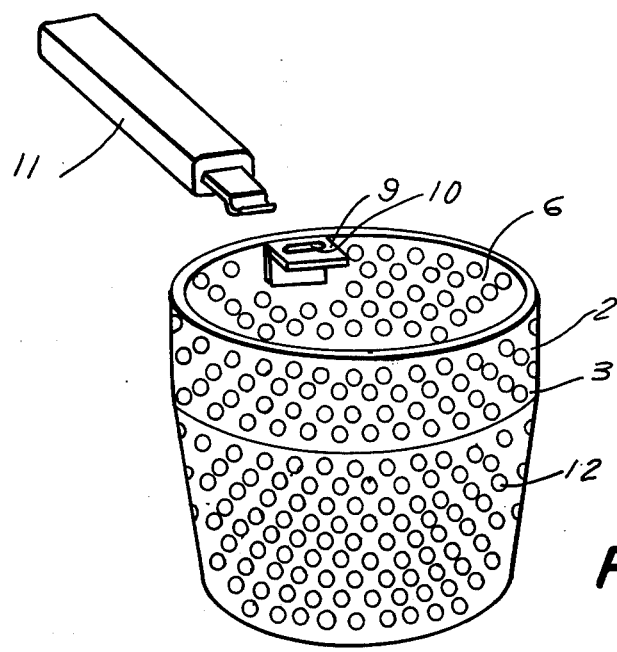
Figure 3:
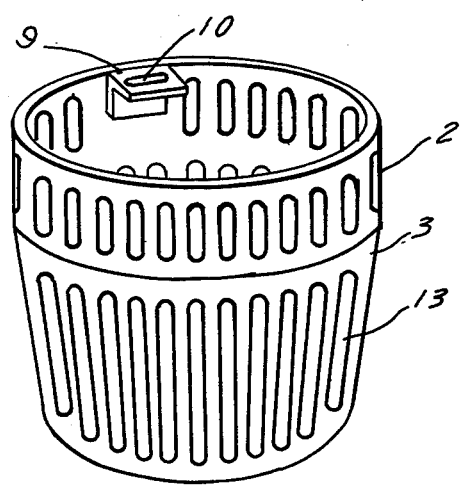

FIG. 1: is a sectional view of a metallic bowl with suspended metallic insert and beating blades, FIG. 2: is a side elevational view of a metallic insert with circular openings and also showing a sheet lug for a handgrip, FIG. 3: is a view similar to FIG. 2 but of a metallic insert with slots instead of circular openings.

FIG. 1 shows a section through a metallic bowl 1 in which a metallic insert 2 is suspended. In the section, it can be recognized how the metallic insert 2 is supported on inwardly oriented creased fins 4 of the metallic bowl 1. In order for the metallic insert 2 to be held in this position, it rests at its endface 5 by an open end 6 against the closing lid 7 of the metallic bowl 1. The closing lid 7 has an opening 14, through which the metallic insert 2 or only the metallic bowl 1 — when the metallic insert 2 is not inserted — can be filled. The metallic insert 2 has circular openings 12 at its entire jacket surface 3, through which the fluid 15 reaches a substance being cooked which is accommodated in the insert 2 inasmuch as space exists between the inwardly oriented creased fins 4 for expansion of the fluid 15.

Rotating beating blades 8, at the one hand, swirl the fluid 15 during the cooking stage and, on the other hand, assure that the fluid 15 can reach each location of the metallic insert 2. An indicated ring 16 represents an arrangement for heating the fluid 15. It can also be recognized, that the metallic insert 2 is so configurated that it ends upwardly of the beating blades 8, in order not to damage the same. In addition thereto, a lug 9 is indicated which is once more illustrated in the FIGS. 2 and 3.

FIG. 2 shows a metallic insert 2 according to FIG. 1. The insert 2 has a jacket 3 which is provided with circular openings 12. At the open end 6, there is affixed a lug 9 with an opening 10, in which the handgrip 11 can engage. When the metallic insert 2 is present in the metallic bowl 1, it can be taken out of the metallic bowl 1 after the cooking stage without any difficulty by means of the handgrip 11 which is hooked in the opening 10 of the lug 9.

The metallic insert 2 of FIG. 3 constitutes a further embodiment of the invention. It differs from the metallic insert 2 of FIG. 2 only by having slots 13 passing through the jacket 3.

I claim:

1. In a device for heating and mixing foods, a combination comprising an upright bowl having an upright axis and including a circumferential wall, surrounding and a bottom wall substantially normal to said axis; means for heating the contents of said bowl; a mixing blade mounted for rotation in said bowl about said upright axis, so as to macerate foodstuffs admitted into said bowl; means for rotating said blade; and means for cooking the foodstuffs in said bowl without subjecting them to maceration by the rotating mixing blade, comprising a liquid-permeable basket insertable into said bowl above and out of contact with said blade and adapted to contain foodstuffs which are to come in contact only with liquid located in said bowl below said basket so that such liquid, when heated by said heating means and agitated by the rotating mixing blade, will contact the foodstuffs in the basket to cook such foodstuffs without maceration of the same.

2. A combination as defined in claim 1, wherein said basket insert is a substantially cup-shaped element.

3. A combination as defined in claim 2, wherein said blade is mounted on said bottom wall of said bowl and extends upwardly therefrom; and wherein said basket has a bottom situated above the path of orbiting of said blade upon insertion.

4. A combination as defined in claim 3, wherein said basket has an open end spaced from said bottom; and further comprising a lid for said bowl which abuts against said open end upon assembly with said bowl.

5. A combination as defined in claim 4, wherein said basket has an inwardly extending lug at said open end thereof; and further comprising a separate handgrip operative for engaging said lug for removing and inserting said insert from and into said bowl.

6. A combination as defined in claim 5, wherein said lug has an opening and said handgrip has an engaging portion insertable into said opening for engaging said handgrip with said lug.

7. A combination as defined in claim 2, wherein said bowl has inwardly projecting ribs; and wherein said basket has a peripheral wall supported on said ribs upon insertion.

8. A combination as defined in claim 2, wherein said bowl and said basket have compatible frustoconical configurations.

9. A combination as defined in claim 2, wherein said insert has walls having a multitude of perforations.

10. A combination as defined in claim 9, wherein said perforations are circular.

11. A combination as defined in claim 9, wherein said perforations are slot-shaped.

12. A combination as defined in claim 1, and further comprising a housing separate from said bowl; and wherein said heating means and said orbiting means are accommodated in said housing.

13. A combination as defined in claim 1, wherein said orbiting means includes a drive and a transmission interposed between said drive and said blade.

14. A combination as defined in claim 1, wherein said bowl is of a metallic material; and wherein said basket is perforated and also of a metallic material.

* * * * *